United States Patent [19]

Ausborn

[11] Patent Number: 5,056,021

[45] Date of Patent: Oct. 8, 1991

[54] METHOD AND APPARATUS FOR ABSTRACTING CONCEPTS FROM NATURAL LANGUAGE

[76] Inventor: Carolyn Ausborn, 1904 Bluebird Ave., Huntsville, Ala. 35816

[21] Appl. No.: 363,181

[22] Filed: Jun. 8, 1989

[51] Int. Cl.$^5$ ............................................. G06F 15/21
[52] U.S. Cl. .................................................... 364/419
[58] Field of Search ......................................... 364/419

[56] References Cited

U.S. PATENT DOCUMENTS 4,942,526 7/1990 Okajima et al. ...................... 364/419

OTHER PUBLICATIONS

Lakhuti, D. G. et al., "Facilities and Procedures for the Conceptual Interpretation of Incoming Messages in a Natural Language", Trans. Sov. J. Comput. Syst. Sci. (U A) vol. 25, No. 4, Jul-Aug. 1987, 156–64.

Braun, S. et al., "Automatic, Semantics-Based Indexing of Natural Language Texts for Information Retrieval Systems", Information Processing & Management, vol. 12, No. 2, 1976, 147–153.

Primary Examiner—Clark A. Jablon
Attorney, Agent, or Firm—Cushman, Darby & Cushman

[57] ABSTRACT

A method and apparatus for abstracting meanings from natural language words. Each word is analyzed for its semantic content by mapping into its category of meanings within each of four levels of abstraction. The preferred embodiment uses Roget's Thesaurus and Index of Classification to determine the levels of abstraction and category of meanings for words. Each of a sequence of words is mapped into the various levels of abstraction, forming a file of category of meanings for each of the words. The common categories between words are determined, and these common elements are output as data indicative of the most likely categories of meaning in each of the levels of abstraction to indicate the proper meaning intended to be conveyed. This data is then processed according to a rule to obtain a result.

34 Claims, 4 Drawing Sheets

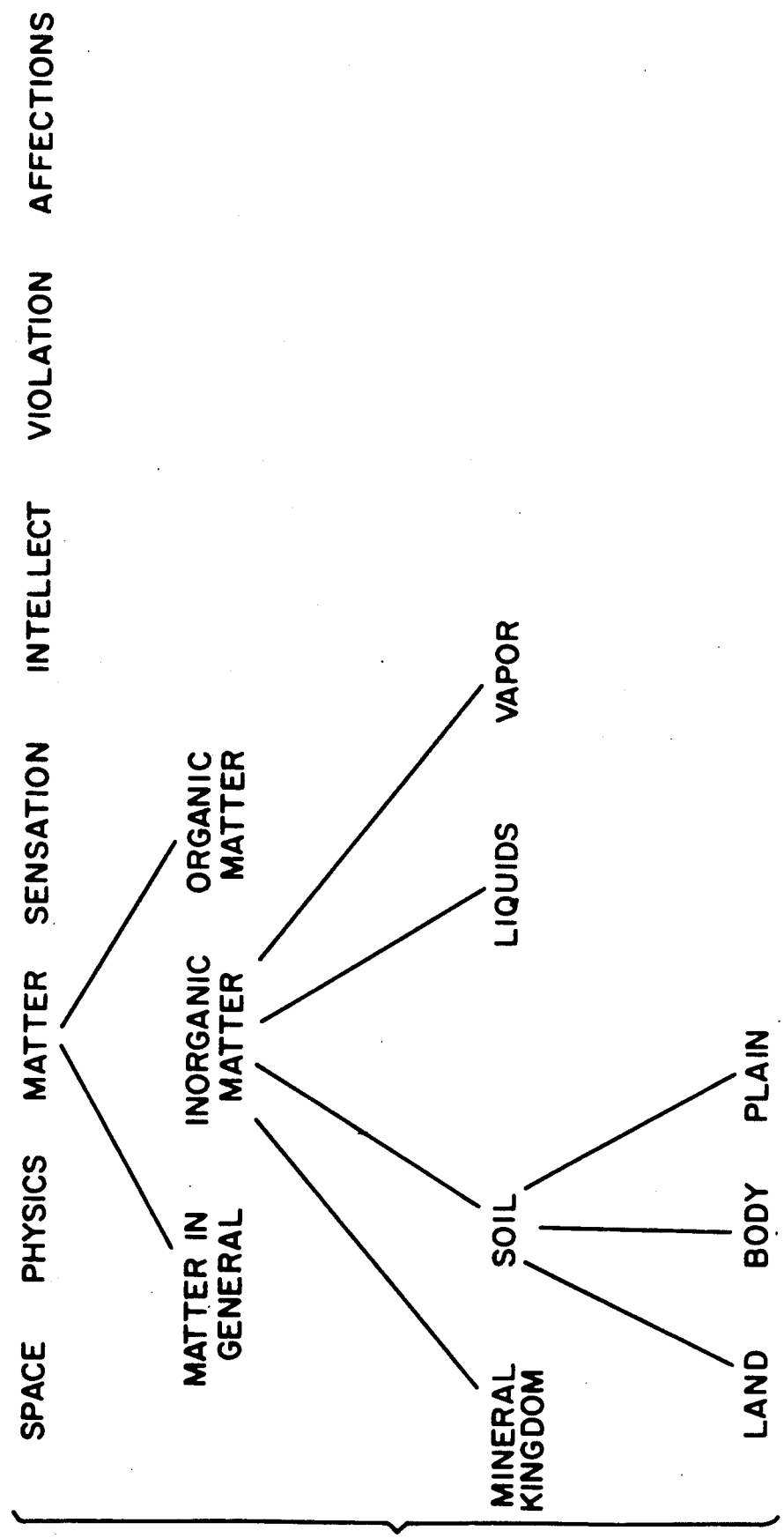

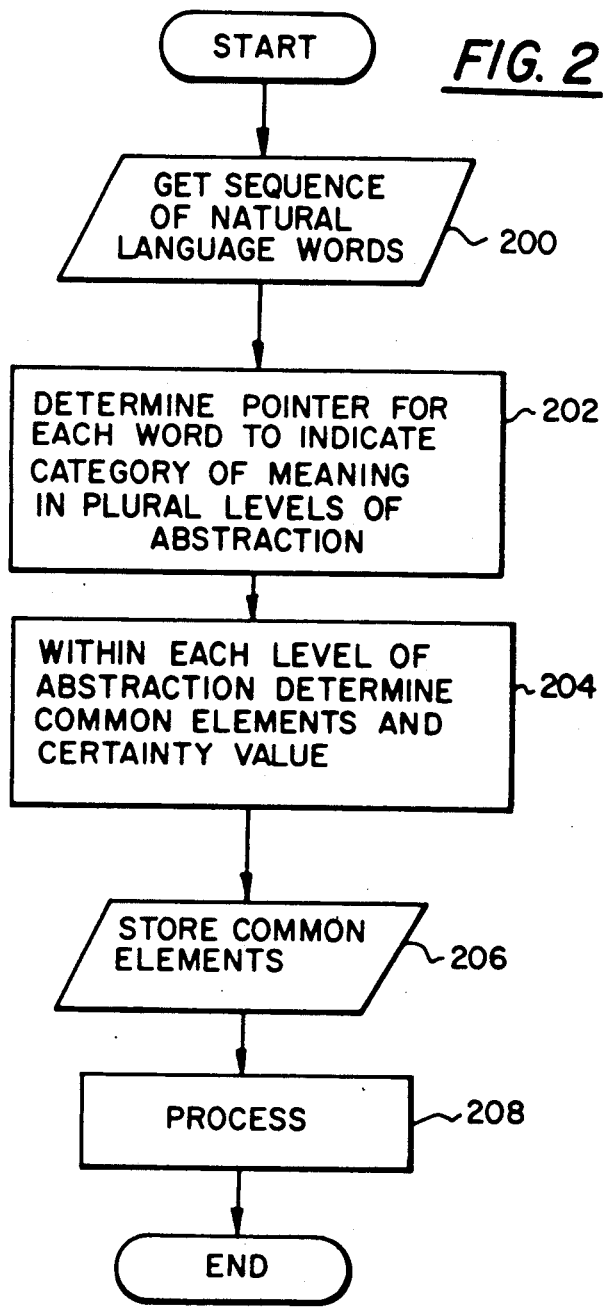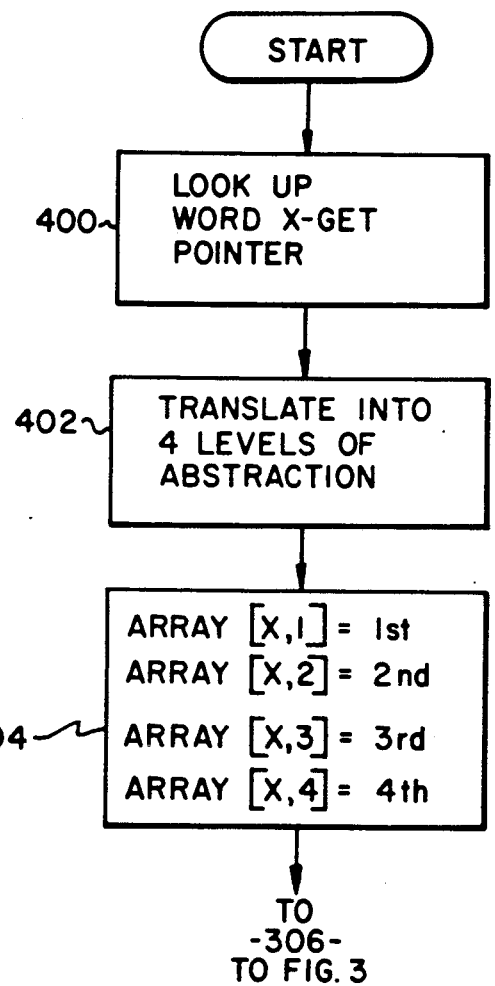

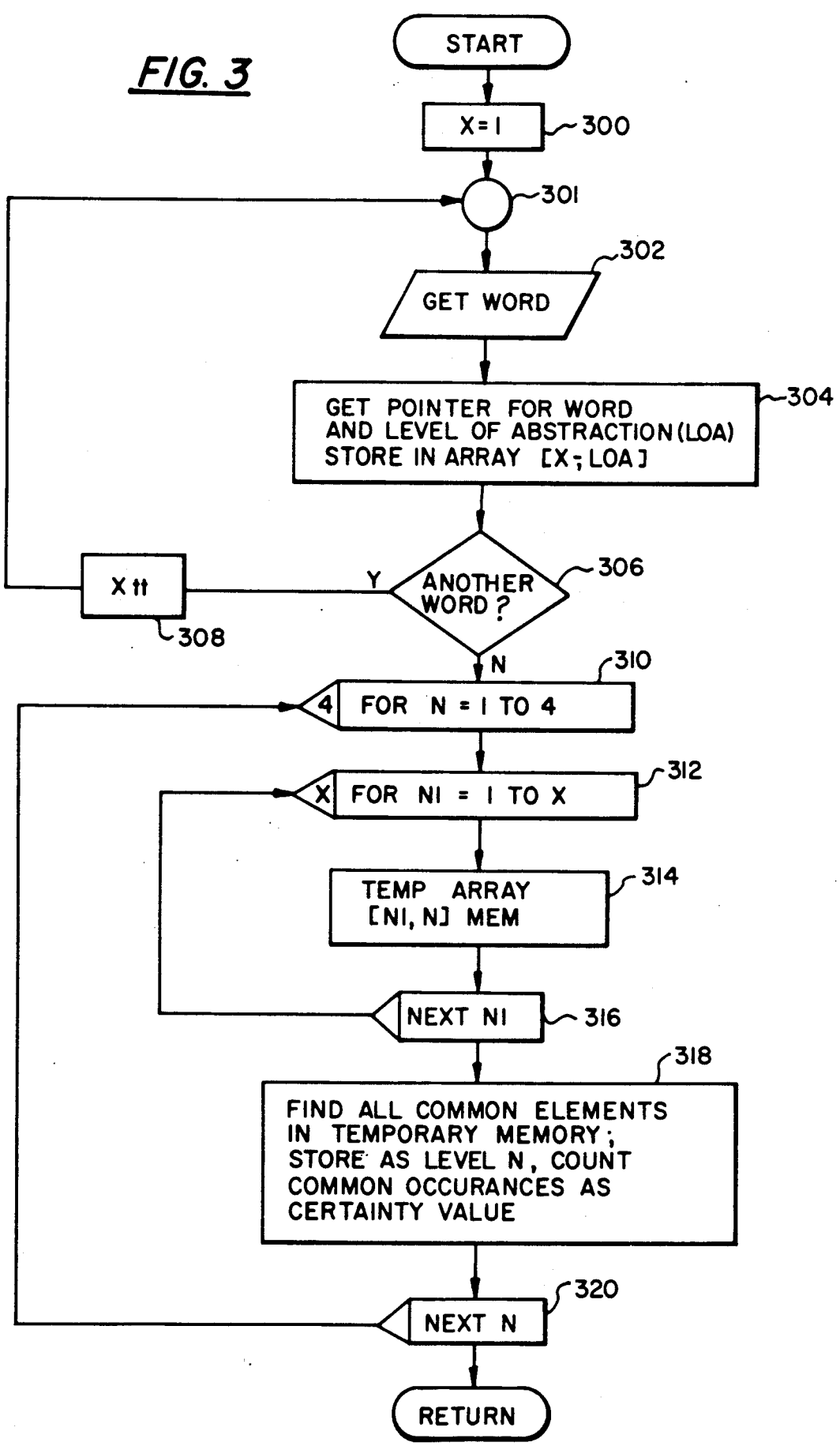

METHOD AND APPARATUS FOR ABSTRACTING CONCEPTS FROM NATURAL LANGUAGE

FIELD OF THE INVENTION

The present invention defines a system for abstracting concepts from natural language. This system enables an input sequence of words in natural language to be abstracted into categories of meanings which represent the concepts underlying the natural language phrases. This technique has application to classifying the information in a sequence for use in expert systems, database processing, artificial intelligence, and other similar fields of endeavor.

BACKGROUND OF THE INVENTION

Human beings communicate ideas with one another using a mechanism known as natural language. Natural language evolved as a medium of communications, as human beings learned to communicate with one another. The specific evolution and structure of our natural language is of little concern to all of us when we speak or write in it. However, due to the inherent structure of natural language, it is an imperfect mechanism for conveying ideas. The human brain, through its intricate and somewhat intuitive workings, translates natural language into concepts and ideas, and allows communications between different individuals using natural language through a complicated translation process that no machine has been able to duplicate.

Machines have no intuitive conceptualization capabilities as of this date (1989). Therefore many difficulties have been encountered in the attempt to teach machines to understand natural language. Machines communicate in languages which were specially invented for the machines and which do not include the ambiguities endemic to natural, evolved languages.

One of the most crucial problems in the artificial intelligence field is the presentation to a machine of the conceptual knowledge behind natural language.

Conceptual knowledge is the knowledge which is known by a human being as a function of semantic meaning. Aristotle had the view (known as the Aristotlean view) that meanings are represented most commonly in concepts which are actualized by words. For instance, when a human being uses the word "chair", the purpose of the word is not to use the actual word itself (e.g. not the letters c•h•a•i•r), but to denote the meaning of the item (a chair) behind the word "chair". The interpretation of language (such as the word chair) as a whole functions primarily at the conceptual level. That is, in our example we interpret the language which we hear (the compressions and rarefactions of air which comprise the sounds comprising the word "chair⇌") as the item which is represented by the word "chair."

Aristotle's line of reasoning implies that meaning has three elements. The first element is the word itself, which differs from language to language, and even within its own language has inherent ambiguities. For instance, the word "chair" as a noun may mean a seat, a chair rail, or a chair lift, or as a verb, may infer leadership, e.g., to chair a committee, for instance. The second level are the mental images of concepts in the mind, which are signified by the word which are the same for all people. The concepts, for instance, are those which the listener develops when he hears the word "chair".

The third element is the concept itself, which is the chair itself, and is the same for all people.

The second and third elements, the concepts and the things themselves, were believed by Aristotle to be the same for all people. It is only the words which differ.

Moreover, the concepts and the things themselves are totally unambiguous, while most words in natural language are ambiguous.

SUMMARY OF THE INVENTION

The present invention has an object of translating a sequence of words in natural language into a group of concepts based on the sequence, the concepts being of a type which are common to all people. The present invention links each word in a phrase to the concepts behind the word, to link the word to the concept.

The present invention defines a method and apparatus which translates each natural language word into a plurality of categories of meaning. Almost all words in natural language are ambiguous, and almost all words have such a plurality of such categories of meaning. After each word is translated into the plurality of categories of meaning which it can represent, common ones of said categories of meaning are ascertained. This determination of commonality indicates that this common categories of meaning may be an actual meaning conveyed by the phrase.

According to a preferred embodiment of the invention, a database is used which includes a plurality of usages of each word organized into different levels of generality, called levels of abstraction. The preferred mode of the invention uses Roget's International Thesaurus, 4th Edition, to obtain these usages of each word. Roget's classification organizes each word into its conceptual meanings based on the membership of the the word in the cluster of linguistic signs that go to make up some large and very general concept. Such a database will be referred to throughout this application as a Roget-type database. Roget's index to Classifications is reproduced as an Appendix to this application. It includes four levels ranging from most specific to least specific, and all words in the English language can be classified into these categories.

A best mode of the present invention implements Roget's taxonomy along with the Principle of Commonality. This principle extracts the common elements within each level of an abstraction according to Roget's taxonomy. The program takes as input a sequence of natural language words. Each word is traced through Roget's taxonomy from the most specific to the most general. Each level of abstraction is then examined to determine common elements within the level of abstraction which are common to any two elements of the phrase. The common elements receive a certainty value, based on the number of occurences of the element. The common elements and certainty value are used to generically describe the knowledge contained in the phrase.

BRIEF DESCRIPTION OF THE DRAWINGS

These and other advantages of the invention will be described in detail with reference to the accompanying drawings, in which FIG. 1 shows an example of Roget's classification system using four progressively more specific levels of abstraction, as used in the preferred mode of the present invention;

FIG. 2 shows a general flowchart of the operation of the present invention;

FIG. 3 shows a more detailed flowchart of the operation of classifying the words according to their meaning;

FIG. 4 shows detail on how each word is classified into the various levels of abstraction;

DESCRIPTION OF THE PREFERRED EMBODIMENT

Figure 5:
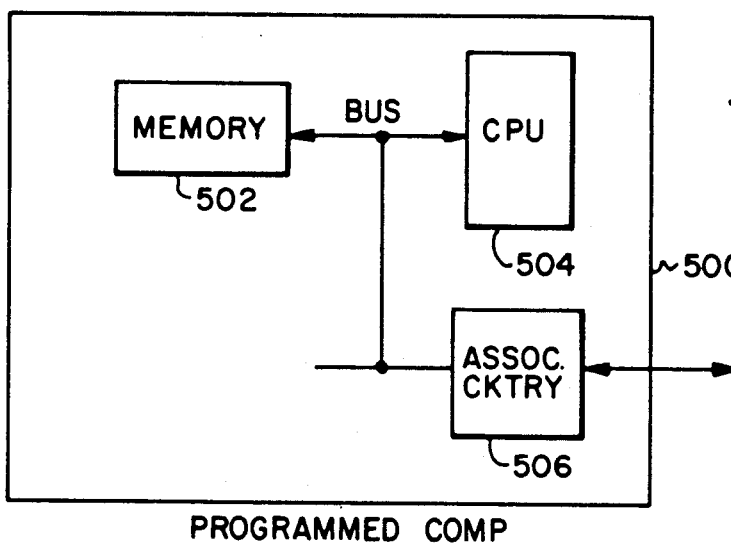
FIG. 5 shows a sample hardware layout of the present invention.

The inventor of the present invention has first made the realization of an alternative use of a database which includes meanings of words organized by levels of abstraction. One such database is found in Roget's International Thesaurus.

A thesaurus is a tool for transforming ideas into words. Its most common use is for determining synonyms or antonyms. When a writer has an idea (a conceptualization of a meaning) and wants a word for it, the writer consults a thesaurus in order to determine all of the possible words for the idea.

The inherent organization of a thesaurus is by conceptualization of ideas, organized into words which express the ideas. The inventor of the present invention has first realized that this organization has an application when it is used in reverse—to obtain the ideas behind words from the words themselves.

The inventor has also pioneered a technique for using these meanings, and has titled it "the principle of commonality". This technique is used for determining which ones of the many meanings are applicable to a sequence of words or phrase. This phrase may, of course, be a sentence. This principle finds common meanings between various words of a sequence and uses these common meanings as the key meanings: those which are most likely to be the ones of the meanings intended to be conveyed by the phrase.

The present invention has been embodied using Roget's International Thesaurus, 4th Edition, as the preferred embodiment of a database for obtaining ideas and meanings behind various words. However, it should be understood that any similarly organized database or classification scheme could be equivalently used.

Peter Mark Roget organized his thesaurus in 1852 by producing a finite list of unambiguous concepts, or categories of meaning, and identifying the relationship among these concepts as a hierarchy. Each ordinary word in natural language was mapped from the natural language into a hierarchy of categories of meaning, so that each word has its many meanings related into many of the single concepts, each of which is unambiguous. A proposed use for this is to determine synonyms.

Roget's conceptual taxonomy is organized according to the structure of FIG. 1. This cultural taxonomy is organized into four hierarchical levels of abstraction. The fourth level of abstraction is the most general, and has eight categories of meaning. All of these eight categories of meaning are shown in FIG. 1, and include *ABSTRACT RELATIONS; SPACE; PHYSICS; MATTER; SENSATION; INTELLECT; VOLITION;* and *AFFECTIONS*. All words in the natural English language can be classified into one of these eight, most-general categories of meaning within the fourth (most-general) level of abstraction. In fact, Roget has done so throughout his Thesaurus.

Within, and more specific than, each of these categories of meaning at the fourth level of abstraction are a number of categories at the third levels of abstraction. For instance, within the category of meaning at the fourth level of abstraction known as *MATTER*, there are three categories of meaning at the third level of abstraction: *MATTER IN GENERAL; INORGANIC MATTER;* and *ORGANIC MATTER*. All other categories of meaning at the fourth level of abstraction have a similar organization of categories at the third level.

Each of the categories of meaning within the third level of abstraction can be expanded into a number of more specific categories of meaning within a second level of abstraction. For instance, inorganic matter can be expanded into *MINERAL KINGDOM; SOIL; LIQUID;* and *VAPORS*.

Finally, the first level of abstraction and its associated categories of meaning are the most specific, and each of the second categories of meaning are expanded into first categories of meaning. For instance, *SOIL* can be expanded into *LAND; BODY OF LAND;* and *PLAIN*.

Roget has classified each word in natural language into categories of meaning within each of the four levels of abstraction. Some of these four levels of categories of meaning may not exist, however, for certain words. For instance, within the level of abstraction 4, the category of meaning *MATTER* has a third level of abstraction category of meaning labelled as *MATTER IN GENERAL*. Under this third category of meaning is no second category of meaning, but rather the third category of meaning *MATTER IN GENERAL* has only first level of abstraction categories of meaning depending therefrom, including *UNIVERSE; MATERIALITY; IMMATERIALITY; MATERIAL; CHEMICAL; OILS AND LUBRICANTS;* and *RESINS AND GUMS*.

The inventor has determined that using this hierarchy allows each word in a phrase of a natural language to be grouped according to its meaning. Each "word" in a phrase can be analyzed to determine the appropriate categories of meaning from the Roget's classification that apply thereto. These categories of meaning from the four levels of abstraction are stored as functions of their level of abstraction. When the entire phrase has been analyzed, common categories of meaning within levels of abstraction are determined and assigned a certainty value based on how many times they occur. If any two words in the phrase have a common category of meaning within any level of abstraction, there is a high probability that this is a meaning behind these words when used in the phrase. However, the commonality need not be between all words in the phrase and any two occurrences of category of meaning within any level of abstraction.

The term "word" is used loosely throughout the specification and claims, and refers to a structure which may be more than one natural language word. For instance, the word may include an article (such as "a word") or may be an entire verb such as "to obtain". It should be understood throughout this specification and claims that this terminology of "a word" refers to one conceptual structure to be analyzed, and does not necessarily refer only to a single natural language word.

As explained above, Roget's conceptual hierarchy can be used to trace the categories of meaning for a word through different levels of abstraction. The way in which this is commonly looked up using Roget's levels of abstraction, will be demonstrated herein using the word "human" as an example.

When the word "human" is located in the Thesaurus, the following entry is found:

HUMAN
   N. PERSON 417.3
   ADJ. KIND 938.13
   MANKIND 417.10
   PITYING 944.7

This shows four possible meanings of the word *HUMAN* and the different levels of abstraction within which these meanings lie. The meanings are either in a fourth level of abstraction category called *MATTER* (including numbers 375-421) or a category called *AFFECTIONS* (including numbers 855-1042). (See Appendix showing the synopsis of categories of Roget's Thesaurus.) Within each of these categories of meaning at the fourth level of abstraction is a plurality of categories of meaning for the third level of abstraction which includes *ORGANIC MATTER* (including categories of meaning 406-421 and in which mankind (417.10) and person (417.3) are included, *SYMPATHETIC AFFECTIONS* (922-956 and in which *KIND* (938.13) and *PITYING* (944.7) are included. Within each of these categories of meaning at the third level of abstraction is a plurality of categories of meaning for the second level of abstraction covering the meanings of *HUMAN* which includes *MANKIND* (417-418), *BENEVOLENCE* (938-943) and *SYMPATHY* (944-948). The word *HUMAN* can be mapped using this kind of exercise to obtain the possible semantic ideas behind the word. The correct one of these meanings is determined using the principle of commonality.

Roget's taxonomy of concepts is similar to what John Haugeland has called "stereotypes". However, Roget's system supplies the pointers to pick out the stereotypes according to our own natural language. The taxonomy reaches toward the deeper level to a level of communication, and is organized according to our natural language to enable us to more easily grasp the ideas behind our natural language.

One of the most important aspects about Roget's taxonomy is that it is not domain-specific. It not only contains information about tangible concepts such as physics and matter, but also about intangible concepts such as affection and sensations.

Although the preferred embodiment is described herein using Roget's taxonomy and Roget's Thesaurus, it should be understood that any similar database which includes information about uses of words could similarly be used. Roget's Thesaurus is the most comprehensive database of this type known to the inventor of the present invention, and therefore, has been used as the preferred mode. However, any other similarly organized database could alternatively be used, and should be considered equivalent in this regard.

The present invention makes use of a relation found by the inventor, using a principle of commonality, implemented into a program which the inventor has called "WordMap". This program implements Roget's taxonomy along with the principle of commonality. This principle extracts the common categories of meaning within each level of abstraction according to Roget's taxonomy. The program takes as input a sequence of natural language words. Each word is traced through Roget's taxonomy from the most specific level of abstraction to the most general level of abstraction. The categories of meaning within any level of abstraction are then examined to determine common elements within the level of abstraction. The common elements are used to generically describe the knowledge contained in the phrase.

The wordmap program will now be described in detail with reference to the accompanying figures of the present invention representing flow charts of the wordmap program. FIG. 2 shows a most general flow chart of the wordmap program. FIG. 2 starts with step 200 in which the sequence of natural language words which is to be analyzed is obtained. Step 202 follows, in which a pointer, which is in this embodiment Roget's classification number, is determined for each word to indicate a category of meaning for each of the plural levels of abstraction in the pre-stored database. For instance, the pointers for the word human are the numbers 417.3, 417.10, 938.13 and 944.7.

At step 204, a determination of commonality of categories of meaning, and a determination of a certainty value for this commonality, is made within each of the multiple levels of abstraction for the words of the phrase. Any common categories of meaning within a particular level of abstraction are taken as "answers", and the certainty value indicates how many times the commonality occurs, therefore indicating how certain it is to have occured. At step 206, each of the common categories of meaning are stored. At step 208 these common categories are processed according to rules for the specific application. One example of such a rule will be described below. This ends the process.

A more detailed flow chart of steps 200-206 is shown in FIG. 3. At step 300, a variable x is set to 1. The variable x is used to denote the word number within the word sequence that is currently being processed. Step 302 is executed to access the word pointed to by the variable x. The particular word being processed is correlated to determine its categories of meaning at the various levels of abstraction within the pre-stored database at step 304 and the resulting categories of meaning are stored in an array at an address of the array referenced by array [x, LOA].

A test is made at step 306 to determine if there is another word within the word sequence. If the answer is yes, the variable x is incremented at step 308, followed by control passing to point 301 where the next word pointed to by the variable x (x now having been incremented) is obtained. If no other word is detected at step 306, the entire word sequence has been entered into the array, and the principle of commonality is applied beginning at step 310.

The principle of commonality is applied by processing the two-dimensional array to determine common elements within each particular level of abstraction labeled as levels 1-4, and certainty values based on a number of occurances of commonality. This involves setting up two nested loops. A first nested loop is set up at step 310, from 1 to 4, each element representing one of the multiple levels of abstraction. The second nested loop is between 1 and x, so that one word in the sequence is processed in each pass.

For each word in the word sequence, the contents of the 5 array at [N1, N] are determined at step 314 (N1 being level of abstraction, N being word number x). Each meaning of each word identified by variable x in the sequence is entered into temporary memory while the level of abstraction remains the same. Step 316 executes the "next" loop. At step 318, therefore, all of the meanings for all of the words in the particular level of abstraction (N) have been entered into the temporary memory. Step 318 finds all common categories of meaning and stores these common categories as the result for level N, as well as counting the number of common occurences to store this as the certainty value. This is followed at step 320 by an incrementing of the level of abstraction, to the next level of abstraction.

A brief explanation of the hierarchy and how each meaning for each word is obtained will be explained with reference to FIG. 4. FIG. 4 corresponds substantially to step 304 in FIG. 3. Step 400 looks up word x in the pre-stored database to get its pointer into the many levels of abstraction. This number is processed to get the categories of meaning in each of the four levels of abstraction according to Roget's classification system at step 402. The categories of meaning comprising the four levels of abstraction are then stored at step 404, followed by step 306 (FIG. 3).

A first example of the operation of the wordmap program explained with reference to FIGS. 2–4 will now be given with reference to Tables 1 and 2 which follow:

TABLE 1

| WE | HAVE | NOTHING | IN | COMMON |
|---|---|---|---|---|
| I. | Event | Nonexistence | Newness | Unimportance |
|  | Receiving | Absence | Location | Mediocrity |
|  | Production; Birth | Unimportance | Interiority | Language |
|  | Knowledge | Unsubstantiality | Reception | Plain Speech |
|  | Permission |  | Friendship | Knowledge |
|  | Affirmation |  | Ingress; Entrance | Mankind |
|  | Memory |  |  | Plants |
|  | Intelligibility |  |  | Frequency |
|  | Deception |  |  | Generality |
|  | Compulsion |  |  | Normality |
|  | Possession |  |  | Correlation |
|  | Retention |  |  | Inferiority |
|  |  |  |  | Mean |
|  |  |  |  | Prose |
|  |  |  |  | Cooperation |
|  |  |  |  | Property |
|  |  |  |  | Participation |
|  |  |  |  | Amusement |
|  |  |  |  | Vulgarity |
|  |  |  |  | Commonality |
|  |  |  |  | Plainness |
|  |  |  |  | Dullness |
| II. | Possession | Being in Abstract | Relative Space | Mankind |
|  | Power in Operation | Being in Concrete | Social Affections | Esteem |
|  | Comprehension | Existence in Space | Time w/Reference | Recurrent Time |
|  | Acceptance | Adaptation to Time | to Age | Language |
|  | Consent |  | Motion w/Reference | Sharing |
|  | Recollection |  | to Direction | Comprehension |
|  | Transfer of Property |  | External & Internal | Support |
|  |  |  | Dimensions | Possession |
|  |  |  |  | Adaptation to Ends |
|  |  |  |  | Absolute Relation |
|  |  |  |  | Conformity to Rule |
|  |  |  |  | Distributive Order |
|  |  |  |  | Comparative Quantity |
|  |  |  |  | Discriminative Affections |
|  |  |  |  | Linguistic Representation |
|  |  |  |  | Recurrent Time |
|  |  |  |  | Vegetable Life |
|  |  |  |  | Pleasure; Pleasurableness |
|  |  |  |  | Style; Mode of Expression |

TABLE 2

| WE | HAVE | NOTHING | IN | COMMON |
|---|---|---|---|---|
| III. | Event | Existence | Time | Quantity |
|  | Power | Space in General | Dimensions | Relation |
|  | States of Mind | Conditions | Motion | Order |
|  | Authority; Control |  | Sympathetic Affections | Time |
|  | Possessive Relations |  | Space in General | Conditions |
|  | Communication of Ideas |  |  | Support; Opposition |
|  | Intellectual Faculties |  |  | Organic Matter |
|  | & Processes |  |  | Communication of Ideas |
|  |  |  |  | Intellectual Faculties & Processes |
|  |  |  |  | Possessive Relations |
|  |  |  |  | Personal Affections |
| IV. | Intellect | Space | Affections | Matter |
|  | Volition | Volition | Space | Intellect |
|  | Abstract | Abstract | Abstract | Volition |
|  | Relations | Relations | Relations | Abstract Relations |

| TABLE 2-continued | | | |
|---|---|---|---|
| WE | HAVE | NOTHING | IN | COMMON |
| | | | | Affections |

Tables 1 and 2 show a phrase *WE HAVE NOTHING IN COMMON* being analyzed and processed, and shows the categories of meaning for each word in the phrase, being grouped by word and level of abstraction. All common elements are underlined. Level of abstraction IV is the most general level and level I is the most specific level.

The phrase *WE HAVE NOTHING IN COMMON* is processed in level I (most specific) to obtain the common categories of *UNIMPORTANCE* and *KNOWLEDGE*. These categories relate to the phrase as follows:

First of all, this statement is about knowledge of the person making the statement (*KNOWLEDGE*). The import of this phrase comes from the meaning of the sentence. "We have nothing in common." generally means that our relationship is not important (*UNIMPORTANCE*).

Within the level of abstraction II (second most specific), the common elements are *POSSESSION, COMPREHENSION,* and *ADAPTATION TO ENDS.* The statement *WE HAVE NOTHING IN COMMON* is a statement of the user's comprehension. *POSSESSION* is also an indication that the possessions between the speaker and the speakee have nothing in common. *ADAPTATION TO ENDS* relates to the inherent meaning of the phrase, that there is no adaptation between the speaker and the speakee.

Level of abstraction 2 has the common elements of *POSSESSIVE RELATIONS, COMMUNICATIONS OF IDEAS, INTELLECTUAL FACULTIES AND PROCESSES, CONDITIONS,* and *TIME.* Among these, perhaps the most interesting is that of *POSSESSIVE RELATION.* The phrase *WE HAVE NOTHING IN COMMON* is the type of phrase which might be said from one person who knows another, as an intimate statement to the other. The principle of commonality has enabled this meaning to be gleaned from the phrase, even though no one word by itself might be indicative of this relationship.

The wordmap program has been explained above, and is used according to the present invention to abstract meaning from words within a sequence of words. Many uses for this program would be apparent to those having ordinary skill in the art. For example, if the wordmap program were applied to semantic analysis, it could be used for natural language programs. The program could be used in expert systems for knowledge organization. This technique could be used in software engineering for systems specification. In programming languages, the present invention could be used for form, syntax and structure. In information systems, the present invention could find application in preparation of structure, organization and queries. In software libraries, this could be used for queries. In criminal investigations, it could be used for information structuring. Finally, in writing tools, the present application could be used for organizing information.

These examples are not intended to be limiting, and future research would be expected to obtain results which were usable in machine learning, man-machine interfaces, database queries and organization, natural language generation, programming languages, foreign interpretation, composition and text processing tools, expert systems design, and understanding, representing and implementing knowledge based systems.

The information obtained above from the phrase *WE HAVE NOTHING IN COMMON* gives unambiguous meanings for the words in the phrase. This is further processed according to the specific end application, so that it is output from this program in a more organized way. For instance, the information output in the description given above with respect to Tables 1 and 2, is processed using the processing step 208 of FIG. 2. One example of this processing step will be explained herein, it being understood that this example is only one of many ways in which the information could be processed.

The example provided herein is one rule which is used according to the application of specifying software structures. The example given is that of writing a program to correlate the curves of *LINEAR LOGARITHMIC, SEMI-LOGARITHMIC, HYPERBOLIC* and *RECIPROCAL.* These words are input to the wordmap program. The common categories of meaning within each level of abstraction, where Level of Abstraction IV is the most general level of abstraction and Level of Abstraction I is the most specific level of abstraction, are as follows:

| WORDMAP RESULTS - COMMONALITY GENERAL | |
|---|---|
| IV. | ABSTRACT RELATIONS |
| | SPACE |
| | SENSATION |
| | INTELLECT |
| | VOLITION |
| III. | RELATION |
| | ODER |
| | NUMBER |
| | TIME |
| | STRUCTURE; FORM |
| | MOTION |
| | HEARING |
| | COMMUNICATION OF IDEAS |
| | VOLITION IN GENERAL |
| II. | ABSOLUTE RELATION |
| | PARTIAL RELATION |
| | NUMBER IN GENERAL |
| | SPECIAL FORM |
| | MOTION W/REF. TO DIRECTION |
| | REPRESENTATION |
| | FALSEHOOD |
| | PURPOSE |
| I. | CORRELATION |
| | SIMILARITY |
| | NUMBER |
| | MUSIC |

A rule will now e considered for processing the Level II results. A rule is a set of information based on different conditions, which is generated once and stored to become a static part of the concept induction system.

The Level II results of processing this phrase (commonality in Level II) include the categories of meaning *ABSOLUTE RELATION; PARTIAL RELATION; NUMBER IN GENERAL . . . ; PURPOSE.*

Figure 6:
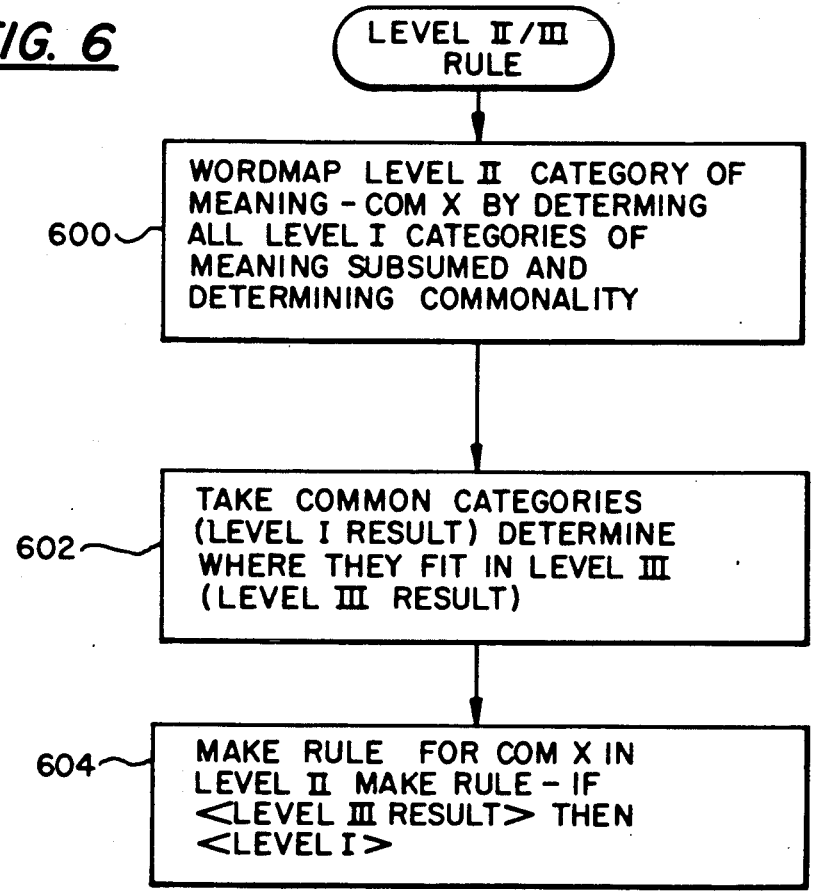
FIG. 6 shows a flow diagram of the operation of the rule used to correlate level of abstraction 2 with level of abstraction 3.

The rule being discussed herein correlates between commonality in Level II and commonality in Level III. Specifically, this rule processes the Level II elements to obtain a Level III result. If the Level II and the Level III result are both present, the rule yields a Level I (most specific) result. The processing according to the the rule will be generally discussed with respect to FIG. 6. The FIG. 6 flowchart shows the derivation of the Level II-III rule. It starts at step 600 where the Level II categories of meaning which are obtained as common elements are processed. Each category of meaning, which will be referred to as COM x, is processed by determining all of the Level of Abstraction I categories of meaning which are subsumed within that particular Level II category of meaning. All of the Level I categories of meaning within the Level II COM x are processed to determine all of the possible meanings within these, and commonality is determined. This commonality is therefore a Level I result which relates to the Level II COM x.

Another commonality operation is executed at step 602 where the common categories in Level I (the Level I result) are processed to determine where these Level I results fit into Level III. The common categories in Level III are called the Level III results. Step 604 makes the rule for COM x in Level II. This rule is:
for COM x in Level II
if <Level III Result> then <Level I>.

Accordingly, this rule correlates the Level II category of meaning, COM x, with a Level III result. If the Level II result and the Level III result are simultaneously present, an answer is received which is the most specific category. An example will be given to follow through the example given for correlating the plurality of curves discussed above.

For instance, the term *ABSOLUTE RELATION* (Level II) within Roget's synopsis of categories shows the following:
II. RELATION
   A. ABSOLUTE RELATION
      9. RELATION
      10. UNRELATEDNESS
      11. RELATIONSHIP BY BLOOD
      12. RELATIONSHIP BY MARRIAGE
      13. CORRELATION
      14. IDENTITY
      15. CONTRARIETY
      16. DIFFERENCE
      17. UNIFORMITY
      18. NONUNIFORMITY
      19. MULTIUNIFORMITY As outlined above, in order to generate this rule for Level II (C.O.M. x being 5. *ABSOLUTE RELATION*), all of the Level I categories, within the Level II category of *ABSOLUTE RELATION* are run "word-mapped" by getting each of their level of abstraction I categories of meaning and determining commonality between these categories of meaning. That is, the words *RELATION, UNRELATEDNESS . . . MULTI-UNIFORMITY* are run through the wordmap program to obtain the common categories of meaning between these words.

The Words obtained from this correlation (Level I results) are used as the "Action" part of an if, then statement. The words generated by this wordmapping of the Level II.A. correlation include the words *COMPARISON; INEQUALITY; DISSIMILARITY; AND UNITY.*

Each of these results of the wordmap program performed on *ABSOLUTE RELATION* is then itself mapped into where it fits within Level III. For instance, the word *COMPARISON*, one of the results of the wordmap between the Level I elements under *ABSOLUTE RELATION*, itself is within the Level I category as no. 491. This is mapped into the hierarchy, to determine its Level III category. The Level III category for *COMPARISON* is *INTELLIGENT FACULTIES AND PROCESSES*. Therefore, a rule is made of the statement:
   if <*INTELLIGENT FACULTIES AND PROCESSES*> then <*COMPARISON*>. This if, then statement is then executed whenever Level II—Absolute Relation is present, and gives the result "*COMPARISON*" when Level III "*INTELLIGENT FACULTIES AND PROCESSES*" is also present.

Based on the wordmap results for the specific example given above, each of the Level II elements is run through the rules generated with wordmap. This is done by determining, for each of the Level II elements, if any of the Level III elements for the rules in the specific Level II elements are present.

Referring to the rules given above under *ABSOLUTE RELATION*, the first if statement determines if "Intelligent Faculties and Processes" exists in Level of Abstraction III. The wordmap results for the program did not include "Intelligent Faculties and Processes", and therefore, the term "Comparison" is not obtained. Using the rule to process the above phrase through all of the Level II elements, the "hits" in our example are referenced with an asterisk in the summary given below.

---

ABSOLUTE RELATION 1:2:5 (that is, most general, level of abstraction IV,
1: ABSTRACT RELATIONS; level of abstraction II #2 RELATION; level of abstraction III, #5 ABSOLUTE RELATION)
```
if    < INTELLIGENT FACULTIES & PROCESSES >   then <COMPARISON>.
if    < QUANTITY >
      < ORDER >
      < CHANGE >                              then   <INEQUALITY>.
if    < QUANTITY >
      < ORDER >
      < STRUCTURE; FORM >                     then   <DISSIMILARITY>.
if    < QUANTITY >
      < ORDER >
      < NUMBER >
      < CHANGE >
      < SUPPORT; OPPOSITION >                 then   <UNITY>.
PARTIAL RELATION 1:2:6
if    < MORALITY >
      < COMMUNICATION OF IDEAS >
      < HEADING >                             then   <REPRESENTATION>.
if    < POSSESSIVE RELATIONS >                then   <BORROWING>
```

-continued

|  |  |  |  |
|---|---|---|---|
|  |  |  | <REPRODUCTION><br><SUBSTITUTION><br><DUPLICATION><br><REPETITION>. |
| if | < POWER ><br>< CHANGE ><br>< NUMBER > | then | <DUPLICATION><br><REPETITION><br><SUBSTITUTION><br><REPRODUCTION>. |
| NUMBER IN GENERAL 1:5:17 |  |  |  |
| if | < ORDER > | then | <CLASSIFICATION>.* |
| SPECIAL FORM 2:13:40 |  |  |  |
| if | < QUANTITY > | then | <COMPLEXITY><br><SIMPLICITY>. |
| MOTION W/REFERENCE TO DIRECTION 2:14:45 |  |  |  |
| if | < RELATION > | then | <DIFFERENCE>*<br><NONUNIFORMITY>*<br><SIMILARITY>*<br><INCREASE>*<br><DECREASE>.* |
| if | < ORDER > | then | <SEQUENCE>*<br><DISCONTINUITY>*<br><ASSEMBLAGE>*<br><ABNORMALITY>* |
| if | < TIME > | then | <REGULARITY OF OCCURRENCE>.* |
| if | < CHANGE > | then | <CHANGE>. |
| REPRESENTATION 6:33:95 |  |  |  |
| if | < COMMUNICATION OF IDEAS > | then | <FALSENESS>.* |
| FALSEHOOD 6:33:104 |  |  |  |
| if | <INTELLECTUAL FACULTIES & PROCESSES> | then | <ILLUSION>. |
| if | < MORALITY | then | <IMPROBITY>. |
| PURPOSE 7:34:113 |  |  |  |
| if | < COMMUNICATION OF IDEAS > | then | <MEANING>.* |

The asterisked terms representing correlations which have proved successful include the terms "Classification"; "Difference"; "Nonuniformity"; "Similarity"; "Increase"; "Decrease"; "Sequence"; "Discontinuity"; "Assemblage"; "Abnormality"; "Regularity of Occurrence"; "Change"; "Falseness" and "Meaning". This represents the output of the correlation between Levels II and III for a program to correlate linear, logarithmic, semi-logarithmic and hyperbolic and reciprocal curves.

A careful examination of these terms shows that they indicate functions that would have to be performed in order to correlate the curves given above. The end result of the wordmapping followed by the processing according to the rules gives a number of the functions which are required to correlate the curves: linear, logarithmic, semi-logarithmic, hyperbolic and reciprocal.

To again summarize this rule:

1) Each category of meaning in Level II is processed (example, MOTION WITH REFERENCE TO DIRECTION, Level II, fifth result), by analyzing each Level I category of meaning within the each Level II category of meaning and determining commonality. (Here, we would do a wordmap between DIRECTION, DEVIATION, LEADING, FOLLOWING . . . OSCILLATION, AGITATION which are the Level I categories of meaning under MOTION WITH REFERENCE TO DIRECTION)

2) The common categories of meaning (here, DIFFERENCE, NONUNIFORMITY, SIMILARITY, INCREASE, DECREASE . . . REGULARITY OF OCCURRENCE, CHANGE) are themselves analyzed, to find the Level III category of meaning within which they are classified.

3) The rule is established as: if >the Level III category obtained≦ (step 2, for instance RELATION) as a result when processing the Level II category found during the wordmap here MOTION W/REFERANCE TO DIRECTION), is itself found as an category of meaning of the wordmap, (here, it is) then <the Level I category(s) which led to this Level III category> (here, DIFFERENCE, NONUNIFORMITY, SIMILARITY, INCREASE, DECREASE) is obtained as a result.

A representative processing structure, including a programmed computer 500 is shown in FIG. 5. This programmed computer 500 includes a memory 502 which includes both temporary memory for storing results, and static memory storing the program used according to the present invent on. A CPU 504 is connected to the memory via buses of the usual sort. The CPU executes the program in the memory, and also uses the memory for storage. Element 506 is used to denote associated circuitry and includes the necessary circuitry associated with the programmed computer such as the clock, the timer chip, the I/O controller, and all other circuitry which is known by those of ordinary skill in the art.

Although only a few embodiments have been described in detail above, those having ordinary skill in the art will certainly understand that many modifications are possible in the preferred embodiment without departing from the teachings thereof. For instance, the CPU 504 could be any kind of CPU including any known CPU, a Z-80, or any of the family 86(86,186,286) CPUs. The memory 502 could be of any conventional type.

Although Roget's Thesaurus has been described as being used as the preferred embodiment, any similar database other than Roget's Thesaurus, called herein a Roget-type database, could be similarly used. Any database which organizes each word into its conceptual meanings based on the membership of the the word in the cluster of linguistic signs that go to make up some large and very general concept could be used as the database, and should be considered equivalent in this regard. Although natural language analysis has been described, any kind of phrase could similarly be analyzed, and all such languages should be considered equivalent.

Therefore, all such modifications are intended to be encompassed within the following claims.

APPENDIX

CLASS ONE: ABSTRACT RELATIONS

- I. EXISTENCE
  - A. Being in the Abstract
    - 1. Existence
    - 2. Nonexistence
  - B. Being in the Concrete
    - 3. Substantiality
    - 4. Unsubstantiality
  - C. Formal Existence
    - 5. Intrinsicality
    - 6. Extrinsicality
  - D. Modal Existence
    - 7. State
    - 8. Circumstance
- II. RELATION
  - A. Absolute Relation
    - 9. Relation
    - 10. Unrelatedness
    - 11. Relationship by Blood
    - 12. Relationship by Marriage
    - 13. Correlation
    - 14. Identity
    - 15. Contrariety
    - 16. Difference
    - 17. Uniformity
    - 18. Nonuniformity
    - 19. Multiformity
  - B. Partial Relation
    - 20. Similarity
    - 21. Dissimilarity
    - 22. Imitation
    - 23. Nonimitation
    - 24. Copy
    - 25. Model
  - C. Correspondence of Relationship
    - 26. Agreement
    - 27. Disagreement
- III. Quantity
  - A. Simple Quantity
    - 28. Quantity
    - 29. Degree
  - B. Comparative Quantity
    - 30. Equality
    - 31. Inequality
    - 32. Mean
    - 33. Compensation
    - 34. Greatness
    - 35. Smallness
    - 36. Superiority
    - 37. Inferiority
    - 38. Increase
    - 39. Decrease
  - C. Conjunctive Quantity
    - 40. Addition
    - 41. Adjunct
    - 42. Subtraction
    - 43. Remainder
    - 44. Mixture
    - 45. Simplicity
    - 46. Complexity
    - 47. Joining
    - 48. Analysis
    - 49. Separation
    - 50. Cohesion
    - 51. Noncohesion
    - 52. Combination
    - 53. Disintegration
  - D. Wholeness
    - 54. Whole
    - 55. Part
    - 56. Completeness
    - 57. Incompleteness
    - 58. Composition
- IV. ORDER
  - A. Order in General
    - 59. Order
    - 60. Arrangement
    - 61. Classification
    - 62. Disorder
    - 63. Disarrangement
  - B. Consecutive Order
    - 64. Precedence
    - 65. Sequence
    - 66. Precursor
    - 67. Sequel
    - 68. Beginning
    - 69. Middle
    - 70. End
    - 71. Continuity
    - 72. Discontinuity
  - C. Collective Order
    - 73. Accompaniment
    - 74. Assemblage
    - 75. Dispersion
  - D. Distributive Order
    - 76. Inclusion
    - 77. Exclusion
    - 78. Extraneousness
    - 79. Generality
    - 80. Particularity
    - 81. Specialty
  - E. Conformity to Rule
    - 82. Conformity
    - 83. Noncomformity
    - 84. Normality
    - 85. Abnormality
- V. NUMBER
  - A. Number in General
    - 86. Number
    - 87. Numeration
    - 88. List
  - B. Determinate Number
    - 89. Unity
    - 90. Duality
    - 91. Duplication
    - 92. Bisection
    - 93. Three
    - 94. Triplication
    - 95. Trisection
    - 96. Four
    - 97. Quadruplication
    - 98. Quadrisection
    - 99. Five and Over
  - C. Indeterminate Number
    - 100. Plurality
    - 101. Numerousness
    - 102. Fewness
    - 103. Repetition
    - 104. Infinity
- VI. TIME
  - A. Absolute Time
    - 105. Time
    - 106. Timelessness
    - 107. Period
    - 108. Spell
    - 109. Interim
    - 110. Durability
    - 111. Transience
    - 112. Perpetuity
    - 113. Instantaneousness
    - 114. Measurement of Time
    - 115. Anachronism
  - B. Relative Time
    - 116. Priority
    - 117. Posteriority
    - 118. Simultaneity
    - 119. The Past
    - 120. The Present
    - 121. The Future
  - C. Time with Reference to Age
    - 122. Newness
    - 123. Oldness
    - 124. Youth

APPENDIX-continued

- 125. Youngster
- 126. Age
- 127. Adult or Old Person

D. Time with Reference to Season
- 128. Season
- 129. Timeliness
- 130. Untimeliness
- 131. Earliness
- 132. Lateness
- 133. Morning, Noon
- 134. Evening, Night E. Recurrent Time
- 135. Frequency
- 136. Infrequency
- 137. Regularity of Recurrence
- 138. Irregularity of Recurrence VII. CHANGE
- 139. Change
- 140. Permanence
- 141. Changeableness
- 142. Stability
- 143. Continuance
- 144. Cessation
- 145. Conversion
- 146. Reversion
- 147. Revolution
- 148. Evolution
- 149. Substitution
- 150. Interchange VIII. EVENT
- 151. Event
- 152. Imminence IX. CAUSATION
- 153. Cause
- 154. Effect
- 155. Attribution
- 156. Chance

X. POWER

A. Power in General
- 157. Power, Potency
- 158. Impotence
- 159. Strength
- 160. Weakness
- 161. Energy
- 162. Violence
- 163. Moderation B. Power in Operation
- 164. Operation
- 165. Productiveness
- 166. Unproductiveness
- 167. Production, Birth
- 168. Product
- 169. Reproduction, Procreation
- 170. Ancestry
- 171. Posterity C. Indirect Power
- 172. Influence
- 173. Absence of Influence
- 174. Tendency
- 175. Liability
- 176. Involvement D. Combination of Forces
- 177. Concurrence
- 178. Counteraction

CLASS TWO: SPACE

I. SPACE IN GENERAL

A. Abstract Space
- 179. Space

B. Specific Space
- 180. Region
- 181. Country
- 182. The Country
- 183. Town, City C. Relative Space
- 184. Location
- 185. Dislocation D. Existence in Space
- 186. Presence
- 187. Absence
- 188. Habitation
- 189. Nativeness
- 190. Inhabitant, Native
- 191. Abode, Habitat
- 192. Room
- 193. Container
- 194. Contents

II. DIMENSIONS

A. General Dimensions
- 195. Size
- 196. Littleness
- 197. Expansion, Growth
- 198. Contraction
- 199. Distance
- 200. Nearness
- 201. Interval B. Linear Dimensions
- 202. Length
- 203. Shortness
- 204. Breadth, Thickness
- 205. Narrowness, Thinness
- 206. Filament
- 207. Height
- 208. Lowness
- 209. Depth
- 210. Shallowness
- 211. Top
- 212. Bottom
- 213. Verticalness
- 214. Horizontalness
- 215. Pendancy
- 216. Support
- 217. Shaft
- 218. Parallelism
- 219. Obliquity
- 220. Inversion
- 221. Crossing
- 222. Weaving
- 223. Sewing C. External and Internal Dimensions
- 224. Exteriority
- 225. Interiority
- 226. Centrality
- 227. Layer
- 228. Covering
- 229. Skin
- 230. Hair, Feathers
- 231. Clothing
- 232. Divestment
- 233. Environment
- 234. Circumscription
- 235. Bounds
- 236. Enclosure
- 237. Interposition
- 238. Intrusion
- 239. Contraposition
- 240. Front
- 241. Rear
- 242. Side
- 243. Right Side
- 244. Left Side

III. STRUCTURE; FORM

A. General Form
- 245. Structure
- 246. Form
- 247. Formlessness
- 248. Symmetry
- 249. Distortion B. Special Form
- 250. Straightness
- 251. Angularity
- 252. Curvature
- 253. Circularity
- 254. Convolution
- 255. Sphericity, Rotundity C. Superficial Form
- 256. Convexity, Protuberance
- 257. Concavity
- 258. Sharpness
- 259. Bluntness
- 260. Smoothness
- 261. Roughness
- 262. Notch

APPENDIX-continued

|     |     |
| --- | --- |
|     | 263. Furrow |
|     | 264. Fold |
|     | 265. Opening |
|     | 266. Closure |
| IV. | MOTION |
| A. | Motion in General |
|     | 267. Motion |
|     | 268. Quiescence |
|     | 269. Swiftness |
|     | 270. Slowness |
| B. | Change of Place |
|     | 271. Transference |
|     | 272. Vehicle |
|     | 273. Travel |
|     | 274. Traveler |
|     | 275. Water Travel |
|     | 276. Mariner |
|     | 277. Ship, Boat |
|     | 278. Aviation |
|     | 279. Aviator |
|     | 280. Aircraft |
|     | 281. Rocketry, Missilery |
|     | 282. Space Travel |
| C. | Motion Conjoined with Force |
|     | 283. Impulse, Impact |
|     | 284. Reaction |
|     | 285. Pushing, Throwing |
|     | 286. Pulling |
|     | 287. Leverage, Purchase |
|     | 288. Attraction |
|     | 289. Repulsion |
| D. | Motion with Reference to Direction |
|     | 290. Direction |
|     | 291. Deviation |
|     | 292. Leading |
|     | 293. Following |
|     | 294. Progression |
|     | 295. Regression |
|     | 296. Approach |
|     | 297. Recession |
|     | 298. Convergence |
|     | 299. Divergence |
|     | 300. Arrival |
|     | 301. Departure |
|     | 302. Ingress, Entrance |
|     | 303. Egress, Emergence |
|     | 304. Insertion |
|     | 305. Extraction |
|     | 306. Reception |
|     | 307. Eating |
|     | 308. Food |
|     | 309. Nutrition |
|     | 310. Ejection |
|     | 311. Excretion |
|     | 312. Secretion |
|     | 313. Overrunning |
|     | 314. Shortcoming |
|     | 315. Ascent |
|     | 316. Descent |
|     | 317. Elevation |
|     | 318. Depression |
|     | 319. Leap |
|     | 320. Plunge |
|     | 321. Circuitousness |
|     | 322. Rotation |
|     | 323. Oscillation |
|     | 324. Agitation |

CLASS THREE: PHYSICS

|     |     |
| --- | --- |
| I. | PHYSICS |
|     | 325. Physics |
|     | 326. Atomics |
|     | 327. Radiation and Radioactivity |
| II. | HEAT |
|     | 328. Heat |
|     | 329. Heating |
|     | 330. Cooking |
|     | 331. Fuel |
|     | 332. Incombustibility |
|     | 333. Cold |
|     | 334. Refrigeration |
| III. | LIGHT |
|     | 335. Light |
|     | 336. Light Source |
|     | 337. Darkness, Dimness |
|     | 338. Shade |
|     | 339. Transparency |
|     | 340. Semitransparency |
|     | 341. Opaqueness |
| IV. | ELECTRICITY AND ELECTRONICS |
|     | 342. Electricity |
|     | 343. Electronics |
|     | 344. Radio |
|     | 345. Television |
|     | 346. Radar and Radiolocators |
| V. | MECHANICS |
|     | 347. Mechanics |
|     | 348. Tools and Machinery |
|     | 349. Automation |
|     | 350. Friction |
| VI. | PHYSICAL PROPERTIES |
|     | 351. Texture |
|     | 352. Weight |
|     | 353. Lightness |
|     | 354. Density |
|     | 355. Rarity |
|     | 356. Hardness, Rigidity |
|     | 357. Softness, Pliancy |
|     | 358. Elasticity |
|     | 359. Toughness |
|     | 360. Brittleness, Fragility |
|     | 361. Powderiness, Crumbliness |
| VII. | COLOR |
|     | 362. Color |
|     | 363. Colorlessness |
|     | 364. Whiteness |
|     | 365. Blackness |
|     | 366. Grayness |
|     | 367. Browness |
|     | 368. Redness |
|     | 369. Orangeness |
|     | 370. Yellowness |
|     | 371. Greenness |
|     | 372. Blueness |
|     | 373. Purpleness |
|     | 374. Variegation |

CLASS FOUR: MATTER

|     |     |
| --- | --- |
| I. | MATTER IN GENERAL |
|     | 375. Universe |
|     | 376. Materiality |
|     | 377. Immateriality |
|     | 378. Materials |
|     | 379. Chemicals |
|     | 380. Oils, Lubricants |
|     | 381. Resins, Gums |
| II. | INORGANIC MATTER |
| A. | Mineral Kingdom |
|     | 382. Inorganic Matter |
|     | 383. Minerals and Metals |
|     | 384. Rock |
| B. | Soil |
|     | 385. Land |
|     | 386. Body of Land |
|     | 387. Plain |
| C. | Liquids |
|     | 388. Liquidity |
|     | 389. Semiliquidity |
|     | 390. Pulpiness |
|     | 391. Liquefaction |
|     | 392. Moisture |
|     | 393. Dryness |
|     | 394. Rain |
|     | 395. Stream |
|     | 396. Channel |
|     | 397. Ocean |
|     | 398. Lake, Pool |
|     | 399. Inlet, Gulf |
|     | 400. Marsh |
| D. | Vapors |
|     | 401. Vapor, Gas |
|     | 402. Air |
|     | 403. Wind |

APPENDIX-continued

404. Cloud
405. Bubble

III. ORGANIC MATTER
A. Animal and Vegetable Kingdom
   406. Organic Matter
B. Vitality
   407. Life
   408. Death
   409. Killing
   410. Interment
C. Vegetable Life
   411. Plants
   412. Botany
   413. Agriculture
D. Animal Life
   414. Animals, Insects
   415. Zoology
   416. Animal Husbandry
E. Mankind
   417. Mankind
   418. Peoples
F. Male and Female
   419. Sex
   420. Masculinity
   421. Femininity

CLASS FIVE: SENSATION

I. SENSATION IN GENERAL
   422. Sensation
   423. Insensibility
   424. Pain
II. TOUCH
   425. Touch
   426. Sensations of Touch
III. TASTE
   427. Taste
   428. Savoriness
   429. Unsavoriness
   430. Insipidness
   431. Sweetness
   432. Sourness
   433. Pungency
   434. Tabacco
IV. SMELL
   435. Odor
   436. Fragrance
   437. Stench
   438. Odorlessness
V. SIGHT
   439. Vision
   440. Defective Vision
   441. Blindness
   442. Spectator
   443. Optical Instruments
   444. Visibility
   445. Invisibility
   446. Appearance
   447. Disappearance
VI. HEARING
A. Perception of Sound
   448. Hearing
   449. Deafness
B. Sound
   450. Sound
   451. Silence
   452. Faintness of Sound
   453. Loudness
C. Specific Sounds
   454. Resonance
   455. Repeated Sounds
   456. Explosive Noise
   457. Sibilation
   458. Stridor
   459. Cry, Call
   460. Animal Sounds
D. Unmusical Sounds
   461. Discord
E. Musical Sounds
   462. Music
   463. Harmonics, Musical Elements
   464. Musician
   465. Musical Instruments

CLASS SIX: INTELLECT

I. INTELLECTUAL FACULTIES AND PROCESSES
A. Faculties
   466. Intellect
   467. Intelligence, Wisdom
   468. Wise Man
   469. Unintelligence
   470. Foolishness
   471. Fool
   472. Sanity
   473. Insanity, Mania
   474. Eccentricity
B. Comprehension
   475. Knowledge
   476. Intellectual
   477. Ignorance
C. Functions of the Mind
   478. Thought
   479. Idea
   480. Absence of Thought
   481. Intuition
D. Reasoning Processes
   482. Reasoning
   483. Sophistry
E. Consideration
   484. Topic
   485. Inquiry
   486. Answer
   487. Solution
   488. Discovery
F. Assessment
   489. Experiment
   490. Measurement
   491. Comparison
   492. Discrimination
   493. Indiscrimination
G. Conclusion
   494. Judgment
   495. Prejudgment
   496. Misjudgment
   497. Overestimation
   498. Underestimation
H. Theory
   499. Theory, Supposition
   500. Philosophy
I. Belief
   501. Belief
   502. Credulity
   503. Unbelief
   504. Incredulity
J. Grounds for Belief
   505. Evidence, Proof
   506. Disproof
K. Qualifications
   507. Qualification
   508. No Qualifications
   509. Possibility
   510. Impossibility
   511. Probability
   512. Improbability
   513. Certainty
   514. Uncertainty
   515. Gamble
L. Conformity to Fact
   516. Truth
   517. Maxim
   518. Error
   519. Illusion
   520. Disillusionment
M. Acceptance
   521. Assent
   522. Dissent
   523. Affirmation
   524. Negation, Denial
II. STATES OF MIND
A. Mental Attitudes
   525. Mental Attitudes
   526. Broad-mindedness

APPENDIX-continued

|     |                            |
| --- | -------------------------- |
|     | 527. Narrow-mindedness     |
|     | 528. Curiosity             |
|     | 529. Incuriosity           |
|     | 530. Attention             |
|     | 531. Inattention           |
|     | 532. Distraction, Confusion |
|     | 533. Carefulness           |
|     | 534. Neglect               |
| B.  | Creative Thought           |
|     | 535. Imagination           |
|     | 536. Unimaginativeness     |
| C.  | Recollection               |
|     | 537. Memory                |
|     | 538. Forgetfulness         |
| D.  | Anticipation               |
|     | 539. Expectation           |
|     | 540. Inexpectation         |
|     | 541. Disappointment        |
|     | 542. Foresight             |
|     | 543. Prediction            |
|     | 544. Presentiment          |
| III.| COMMUNICATION OF IDEAS     |
| A.  | Nature of Ideas Communicated |
|     | 545. Meaning               |
|     | 546. Latent Meaningfulness |
|     | 547. Meaninglessness       |
|     | 548. Intelligibility       |
|     | 549. Unintelligibility     |
|     | 550. Ambiguity             |
|     | 551. Figure of Speech      |
|     | 552. Interpretation        |
|     | 553. Misinterpretation     |
| B.  | Modes of Communication     |
|     | 554. Communication         |
|     | 555. Manifestation         |
|     | 556. Disclosure            |
|     | 557. Information           |
|     | 558. News                  |
|     | 559. Publication           |
|     | 560. Communications        |
|     | 561. Messenger             |
| C.  | Education                  |
|     | 562. Teaching              |
|     | 563. Misteaching           |
|     | 564. Learning              |
|     | 565. Teacher               |
|     | 566. Student               |
|     | 567. School                |
| D.  | Indication                 |
|     | 568. Indication            |
|     | 569. Insignia              |
|     | 570. Record                |
|     | 571. Recorder              |
| E.  | Representation             |
|     | 572. Representation        |
|     | 573. Misrepresentation     |
| F.  | Arts of Design             |
|     | 574. Art                   |
|     | 575. Sculpture             |
|     | 576. Ceramics              |
|     | 577. Photography           |
|     | 578. Graphic Arts          |
|     | 579. Artist                |
| G.  | Language                   |
|     | 580. Language              |
|     | 581. Letter                |
|     | 582. Word                  |
|     | 583. Nomenclature          |
|     | 584. Anonymity             |
|     | 585. Phrase                |
| H.  | Grammar                    |
|     | 586. Grammar               |
|     | 587. Ungrammaticalness     |
| I.  | Style; Mode of Expression  |
|     | 588. Diction               |
|     | 589. Elegance              |
|     | 590. Inelegance            |
|     | 591. Plain Speech          |
|     | 592. Conciseness           |
|     | 593. Diffuseness           |
| J.  | Spoken Language            |
|     | 594. Speech                |
|     | 595. Imperfect Speech      |
|     | 596. Talkativeness         |
|     | 597. Conversation          |
|     | 598. Soliloquy             |
|     | 599. Public Speaking       |
|     | 600. Eloquence             |
|     | 601. Grandiloquence        |
| K.  | Written Language           |
|     | 602. Writing               |
|     | 603. Printing              |
|     | 604. Correspondence        |
|     | 605. Book, Periodical      |
|     | 606. Treatise              |
|     | 607. Abridgment            |
| L.  | Linguistic Representation  |
|     | 608. Description           |
|     | 609. Poetry                |
|     | 610. Prose                 |
|     | 611. Show Business         |
|     | 612. Entertainer           |
| M.  | Uncommunicativeness; Secrecy |
|     | 613. Uncommunicativeness   |
|     | 614. Secrecy               |
|     | 615. Concealment           |
| N.  | Falsehood                  |
|     | 616. Falseness             |
|     | 617. Exaggeration          |
|     | 618. Deception             |
|     | 619. Deceiver              |
|     | 620. Dupe                  |

CLASS SEVEN: VOLITION

|     |                            |
| --- | -------------------------- |
| I.  | VOLITION IN GENERAL        |
| A.  | Will                       |
|     | 621. Will                  |
|     | 622. Willingness           |
|     | 623. Unwillingness         |
| B.  | Resolution; Determination  |
|     | 624. Resolution            |
|     | 625. Perseverance          |
|     | 626. Obstinacy             |
| C.  | Irresolution; Caprice      |
|     | 627. Irresolution          |
|     | 628. Change of Allegiance  |
|     | 629. Caprice               |
|     | 630. Impulse               |
| D.  | Evasion                    |
|     | 631. Avoidance             |
|     | 632. Escape                |
|     | 633. Abandonment           |
| E.  | Inclination                |
|     | 634. Desire                |
|     | 635. Eagerness             |
|     | 636. Indifference          |
| F.  | Choice                     |
|     | 637. Choice                |
|     | 638. Rejection             |
|     | 639. Necessity             |
|     | 640. Predetermination      |
|     | 641. Prearrangement        |
| G.  | Custom                     |
|     | 642. Custom, Habit         |
|     | 643. Unaccustomedness      |
|     | 644. Fashion               |
|     | 645. Social Convention     |
|     | 646. Formality             |
|     | 647. Informality           |
| H.  | Motive                     |
|     | 648. Motivation, Inducement |
|     | 649. Pretext               |
|     | 650. Allurement            |
|     | 651. Bribery               |
|     | 652. Dissuasion            |
| I.  | Purpose                    |
|     | 653. Intention             |
|     | 654. Plan                  |
|     | 655. Pursuit               |
|     | 656. Business, Occupation  |

APPENDIX-continued

- J. Ways and Means
  - 657. Way
  - 658. Means
  - 659. Provision, Equipment
  - 660. Store, Supply
  - 661. Sufficiency
  - 662. Insufficiency
  - 663. Excess
  - 664. Satiety
- K. Use
  - 665. Use
  - 666. Consumption
  - 667. Misuse
  - 668. Disuse
  - 669. Uselessness
- II. CONDITIONS
- A. Adaptation to Ends
  - 670. Expedience
  - 671. Inexpedience
  - 672. Importance
  - 673. Unimportance
  - 674. Goodness
  - 675. Badness
  - 676. Bane
  - 677. Perfection
  - 678. Imperfection
  - 679. Blemish
  - 680. Mediocrity
- B. Wholesomeness
  - 681. Cleanness
  - 682. Uncleanness
  - 683. Healthfulness
  - 684. Unhealthfulness
- C. Health
  - 685. Health
  - 686. Disease
  - 687. Remedy
  - 688. Healing Arts
  - 689. Therapy
  - 690. Psychology and Psychotherapy
- D. Physical Progress
  - 691. Improvement
  - 692. Impairment
  - 693. Destruction
  - 694. Restoration
  - 695. Refreshment
  - 696. Relapse
- E. Security
  - 697. Danger
  - 698. Safety
  - 699. Protection
  - 700. Refuge
  - 701. Preservation
  - 702. Rescue
  - 703. Warning
  - 704. Alarm
- III. VOLUNTARY ACTION
- A. Action
  - 705. Action
  - 706. Inaction
  - 707. Activity
  - 708. Inactivity
  - 709. Haste
  - 710. Leisure
  - 711. Rest, Repose
  - 712. Sleep
  - 713. Wakefulness
- B. Exertion; Endeavor
  - 714. Endeavor
  - 715. Undertaking
  - 716. Exertion
  - 717. Fatigue
  - 718. Worker, Doer
  - 719. Workplace
- C. Preparation
  - 720. Preparation
  - 721. Unpreparedness
- D. Accomplishment
  - 722. Accomplishment
  - 723. Nonaccomplishment
  - 724. Success
  - 725. Failure
  - 726. Victory
  - 727. Defeat
  - 728. Prosperity
  - 729. Adversity
  - 730. Hindrance
  - 731. Difficulty
  - 732. Facility
- E. Adroitness
  - 733. Skill
  - 734. Unskillfulness
  - 735. Cunning
  - 736. Artlessness
- F. Conduct
  - 737. Behavior
  - 738. Misbehavior
- IV. AUTHORITY; CONTROL
- A. Prerogative
  - 739. Authority
  - 740. Lawlessness
- B. Politics and Government
  - 741. Government
  - 742. Legislature, Government Organization
  - 743. United Nations, International Organizations
  - 744. Politics
  - 745. Politico-Economic Principles
  - 746. Politician
- C. Direction
  - 747. Direction, Management
  - 748. Director
  - 749. Master
  - 750. Servant, Employee
- D. Directions
  - 751. Precept
  - 752. Command
  - 753. Demand
  - 754. Advice
  - 755. Council
- E. Constraint
  - 756. Compulsion
  - 757. Strictness
  - 758. Laxness
  - 759. Leniency
- F. Restraint
  - 760. Restraint
  - 761. Confinement
- G. Unrestraint
  - 762. Freedom
  - 763. Liberation
- H. Subjugation
  - 764. Subjection
- I. Compliance
  - 765. Submission
  - 766. Obedience
  - 767. Disobedience
  - 768. Observance
  - 769. Nonobservance
- J. Pledge
  - 770. Promise
  - 771. Compact
  - 772. Security
- K. Proposal
  - 773. Offer
  - 774. Request
- L. Consent
  - 775. Consent
  - 776. Refusal
  - 777. Permission
  - 778. Prohibition
  - 779. Repeal
- M. Commission
  - 780. Commission
  - 781. Deputy, Agent
  - 782. Promotion
  - 783. Demotion, Deposal
  - 784. Resignation
- V. SUPPORT AND OPPOSITION
- A. Support

APPENDIX-continued

|   |   |
|---|---|
| | 785. Aid |
| | 786. Cooperation |
| | 787. Associate |
| | 788. Association |
| | 789. Labor Union |
| B. | Opposition |
| | 790. Opposition |
| | 791. Opponent |
| | 792. Resistance |
| | 793. Defiance |
| C. | Concord |
| | 794. Accord |
| | 795. Disaccord |
| D. | Contention |
| | 796. Contention |
| | 797. Warfare |
| | 798. Attack |
| | 799. Defense |
| | 800. Combatant |
| | 801. Arms |
| | 802. Arena |
| E. | Peace |
| | 803. Peace |
| | 804. Pacification |
| | 805. Mediation |
| F. | Mid-course |
| | 806. Neutrality |
| | 807. Compromise |
| VI. | POSSESSIVE RELATIONS |
| A. | Possession |
| | 808. Possession |
| | 809. Possessor |
| | 810. Property |
| | 811. Acquisition |
| | 812. Loss |
| | 813. Retention |
| | 814. Relinquishment |
| B. | Sharing |
| | 815. Participation |
| | 816. Apportionment |
| C. | Transfer of Property |
| | 817. Transfer of Property or Right |
| | 818. Giving |
| | 819. Receiving |
| | 820. Lending |
| | 821. Borrowing |
| D. | Appropriation |
| | 822. Taking |
| | 823. Restitution |
| | 824. Theft |
| | 825. Thief |
| | 826. Illicit Business |
| E. | Interchange of Property |
| | 827. Commerce, Economics |
| | 828. Purchase |
| | 829. Sale |
| | 830. Businessman, Merchant |
| | 831. Merchandise |
| | 832. Market |
| | 833. Stock Market |
| | 834. Securities |
| F. | Monetary Relations |
| | 835. Money |
| | 836. Finance, Investment |
| | 837. Wealth |
| | 838. Poverty |
| | 839. Financial Credit |
| | 840. Debt |
| | 841. Payment |
| | 842. Nonpayment |
| | 843. Expenditure |
| | 844. Receipts |
| | 845. Accounts |
| | 846. Price, Fee |
| | 847. Discount |
| | 848. Expensiveness |
| | 849. Cheapness |
| | 850. Costlessness |
| | 851. Economy |
| | 852. Parsimony |
| | 853. Liberality |
| | 854. Prodigality |
| | CLASS EIGHT: AFFECTIONS |
| I. | PERSONAL AFFECTIONS |
| A. | Emotion |
| | 855. Feelings |
| | 856. Lack of Feelings |
| B. | Excitability |
| | 857. Excitement |
| | 858. Inexcitability |
| | 859. Nervousness |
| | 860. Unnervousness |
| | 861. Patience |
| | 862. Impatience |
| C. | Pleasure and Pleasurableness |
| | 863. Pleasantness |
| | 864. Unpleasantness |
| | 865. Pleasure |
| | 866. Unpleasure |
| | 867. Dislike |
| | 868. Contentment |
| | 869. Discontent |
| | 870. Cheerfulness |
| | 871. Solemnity |
| | 872. Sadness |
| | 873. Regret |
| | 874. Unregretfulness |
| | 875. Lamentation |
| | 876. Rejoicing |
| | 877. Celebration |
| | 878. Amusement |
| | 879. Dancing |
| | 880. Humorousness |
| | 881. Wit, Humor |
| | 882. Banter |
| | 883. Dullness |
| | 884. Tedium |
| | 885. Aggravation |
| | 886. Relief |
| | 887. Comfort |
| D. | Anticipative Emotions |
| | 888. Hope |
| | 889. Hopelessness |
| E. | Concern |
| | 890. Anxiety |
| | 891. Fear, Frighteningness |
| | 892. Cowardice |
| | 893. Courage |
| | 894. Rashness |
| | 895. Caution |
| F. | Discriminative Affections |
| | 896. Fastidiousness |
| | 897. Taste, Tastefulness |
| | 898. Vulgarity |
| | 899. Ugliness |
| | 900. Beauty |
| | 901. Ornamentation |
| | 902. Plainness |
| | 903. Affectation |
| | 904. Ostentation |
| G. | Pride |
| | 905. Pride |
| | 906. Humility |
| | 907. Servility |
| | 908. Modesty |
| | 909. Vanity |
| | 910. Boasting |
| | 911. Bluster |
| | 912. Arrogance |
| | 913. Insolence |
| H. | Esteem |
| | 914. Repute |
| | 915. Disrepute |
| | 916. Honor |
| | 917. Title |
| | 918. Nobility |
| | 919. Commonalty |
| I. | Contemplative Emotions |
| | 920. Wonder |
| | 921. Unastonishment |
| II. | SYMPATHETIC AFFECTIONS |

APPENDIX-continued

| | |
|---|---|
| A. | Social Relations |
| | 922. Sociability |
| | 923. Unsociability |
| | 924. Seclusion |
| | 925. Hospitality, Welcome |
| | 926. Inhospitality |
| B. | Social Affections |
| | 927. Friendship |
| | 928. Friend |
| | 929. Enmity |
| | 930. Hate |
| | 931. Love |
| | 932. Lovemaking, Endearment |
| | 933. Marriage |
| | 934. Celibacy |
| | 935. Divorce, Widowhood |
| C. | Civility |
| | 936. Courtesy |
| | 937. Discourtesy |
| D. | Benevolence |
| | 938. Kindness, Benevolence |
| | 939. Unkindness, Malevolence |
| | 940. Misanthropy |
| | 941. Public Spirit |
| | 942. Benefactor |
| | 943. Evildoer |
| E. | Sympathy |
| | 944. Pity |
| | 945. Pitilessness |
| | 946. Condolence |
| | 947. Forgiveness |
| | 948. Congratulation |
| F. | Gratefulness |
| | 949. Gratitude |
| | 950. Ingratitude |
| G. | Ill Humor |
| | 951. Ill Humor |
| | 952. Resentment, Anger |
| H. | Selfish Resentment |
| | 953. Jealousy |
| | 954. Envy |
| I. | Reprisal |
| | 955. Retaliation |
| | 956. Revenge |
| III. | MORALITY |
| A. | Morals |
| | 957. Ethics |
| | 958. Right |
| | 959. Wrong |
| B. | Moral Obligation |
| | 960. Dueness |
| | 961. Undueness |
| | 962. Duty |
| | 963. Imposition |
| C. | Moral Sentiments |
| | 964. Respect |
| | 965. Disrespect |
| | 966. Contempt |
| | 967. Ridicule |
| | 968. Approval |
| | 969. Disapproval |
| | 970. Flattery |
| | 971. Disparagement |
| | 972. Curse |
| | 973. Threat |
| D. | Moral Conditions |
| | 974. Probity |
| | 975. Improbity |
| | 976. Justice |
| | 977. Injustice |
| | 978. Selfishness |
| | 979. Unselfishness |
| | 980. Virtue |
| | 981. Vice |
| | 982. Wrongdoing, Sin |
| | 983. Guilt |
| | 984. Innocence |
| | 985. Good Person |
| | 986. Bad Person |
| E. | Moral Practice |
| | 987. Sensuality |
| | 988. Chastity |
| | 989. Unchastity |
| | 990. Indecency |
| | 991. Asceticism |
| | 992. Temperance |
| | 993. Intemperance |
| | 994. Gluttony |
| | 995. Fasting |
| | 996. Intoxication |
| | 997. Sobriety |
| F. | Moral Observance |
| | 998. Legality |
| | 999. Illegality |
| | 1000. Jurisdiction |
| | 1001. Tribunal |
| | 1002. Judge, Jury |
| | 1003. Lawyer |
| | 1004. Legal Action |
| | 1005. Accusation |
| | 1006. Justification |
| | 1007. Acquittal |
| | 1008. Condemnation |
| | 1009. Penalty |
| | 1010. Punishment |
| | 1011. Instruments of Punishment |
| | 1012. Atonement |
| IV. | RELIGION |
| A. | Supernatural Beings |
| | 1013. Deity |
| | 1014. Mythical and Polytheistic Gods and Spirits |
| | 1015. Angel, Saint |
| | 1016. Evil Spirits |
| | 1017. Specter |
| B. | Supernatural Regions |
| | 1018. Heaven |
| | 1019. Hell |
| C. | Religious Beliefs |
| | 1020. Religions, Cults, Sects |
| | 1021. Scripture |
| | 1022. Prophets, Religious Founders |
| | 1023. Theology |
| | 1024. Orthodoxy |
| | 1025. Unorthodoxy |
| D. | Religious Quality |
| | 1026. Sanctity |
| | 1027. Unsanctity |
| E. | Religious Sentiments |
| | 1028. Piety |
| | 1029. Sanctimony |
| | 1030. Impiety |
| | 1031. Nonreligiousness |
| F. | Religious Practice |
| | 1032. Worship |
| | 1033. Idolatry |
| G. | Supernaturalism |
| | 1034. Occultism |
| | 1035. Sorcery |
| | 1036. Spell, Charm |
| H. | Churchdom |
| | 1037. The Ministry |
| | 1038. Clergy |
| | 1039. Laity |
| | 1040. Religious Rites |
| | 1041. Ecclesiastical Attire |
| | 1042. Religious Buildings |

What is claimed is:

1. A method for automatically determining a meaning from a sequence of words in a machine, comprising the steps of:

receiving a sequence of words in the machine;

using said machine to access a database that includes a prestored plurality of categories of meaning for each said word, to obtain at least one category of meaning for each of said words of said sequence; and using said machine to select certain ones of said plurality of categories of meanings by determining ones of said categories of meanings which are common for different ones of said respective words, said common categories of meanings being used as abstracted meanings for the sequence.

2. A method as in claim 1, wherein said database is of the type that includes a plurality of pre-stored categories of meanings at different levels of abstraction for each said word, said levels of abstraction ranging progressively from a first level of abstraction which is a more specific category of meaning of the word to a last level of abstraction which is a more general category of meaning of the word, wherein said at least one category of meaning for each said word includes categories of meanings from each said level of abstraction for each said word, and wherein said selecting step includes the step of determining common categories of meaning within each said level of abstraction for each said word, and using said common categories of meaning for each said level of abstraction as said abstracted meanings within said each level of abstraction.

3. A method as in claim 2, wherein said using said machine to select step includes the steps of:
storing a multiple-dimension array of information from said database, each said level of abstraction representing one dimension of the array, and each word of the sequence representing another dimension of the array, and
using said machine to determine common categories of meanings and numbers of occurrences of said common categories of meanings among said words, within each said one dimension representing each said level of abstraction.

4. A method as in claim 2, further comprising the step of processing said abstracted meaning by correlating categories of meanings within one of said levels of abstraction to categories of meanings within another level of abstraction.

5. A method as in claim 2, wherein said sequence of words is in natural language, and said database is a Roget-type database stored in said machine having multiple levels of abstraction.

6. A method as in claim 5, wherein said database is Roget's thesaurus stored in said machine and has four levels of abstraction.

7. A method as in claim 1, wherein said using said machine to select step includes the steps of:
storing an array of information from said database, each element of the array including said at least one category of meaning for one of said words, and
determining common ones of said categories of meanings.

8. A method for automatically abstracting a meaning from a sequence of words using a machine, comprising the steps of:
receiving a sequence of words in said machine;
accessing a database with said machine of the type that includes a plurality of categories of meanings at different levels of abstraction for each said word, each said level of abstraction ranging progressively from a first level which is a more specific category of meaning of the word to a last level which is a more general category of meaning of the word, to obtain a plurality of categories of meanings for each said word which includes categories of meanings from each said level of abstraction for each said word of said sequence;
using said machine to determine ones of said categories of meanings within each said level of abstraction which are common for different ones of said respective words; and
using said common categories of meanings as abstracted meanings for the sequence.

9. A method as in claim 8, comprising the further step of processing said abstracted meanings to obtain a plurality of classifications into which said sequence belongs.

10. A method as in claim 8, further comprising the step of processing said abstracted meanings by correlating categories of meanings within one of said levels of abstraction to categories of meanings within another level of abstraction.

11. A method as in claim 8, wherein said sequence is in natural language, and said database is a Roget-type database stored in said machine.

12. A method as in claim 11, wherein said database is Roget's international Thesaurus stored in said machine.

13. A method for automatically using a Roget-type database that includes a plurality of categories of meanings at different levels of abstraction for a plurality of words, each said level of abstraction ranging progressively from a first level which is a more specific category of meaning of the word to a last level which is a more detailed category of meaning of the word to abstract a category of meaning from a sequence of words in natural language, comprising the steps of:
receiving a sequence of words in natural language in a machine;
accessing said Roget-type database to obtain a plurality of categories of meanings for each said word from each said level of abstraction for reach said word of said sequence;
using said machine to determine commonality by determining ones of said categories of meanings within each said level of abstraction which are common for different ones of said respective words at said each level of abstraction; and
using said common categories of meanings as abstracted meanings for the sequence.

14. A method for automatically abstracting a category of meaning from a sequence of words using a machine, comprising the steps of:
using said machine to obtain for each of a sequence of words, pointers to all categories of meanings which said each word can convey; and
determining which are the most likely categories of meanings to be intended by the sequence, by determining ones of said categories of meanings which are common for different ones of said respective words.

15. A method as in claim 14, wherein said obtaining step includes the steps of obtaining said categories of meanings at each of a plurality of different levels of abstraction for each said word, said levels of abstraction ranging progressively from a lowest level of abstraction which is a more specific category of meaning of the word to a highest level of abstraction which is a more general category of meaning of the word, wherein said at least one category of meaning for each said word includes categories of meanings from each said level of abstraction for each said word, and wherein said determining step includes the step of determining common elements within each said level of abstraction for each said word, and further comprising the step of using said common categories of meanings as abstracted meanings for the sequence.

16. A method as in claim 15, further comprising the step of processing said abstracted meanings in said machine by correlating categories of meanings within one of said levels of abstraction to categories of meanings within another level of abstraction.

17. A method as in claim 16, wherein said processing step includes the steps of:
deriving and storing a plurality of pre-formed rules for correlating one of said levels of abstraction with another level of abstraction.

18. A method as in claim 17, wherein said rule is derived by:
taking a first level of abstraction and processing each category of meaning in said first level of abstraction by correlating categories of meanings within each of a second level of abstraction more specific than said first level of abstraction to get a plurality of results in each said second level of abstraction for each said first level of abstraction,
mapping each said result in said second level into a third level of abstraction more general than said first level; and
determining if any of said mapped third level results are present and using said second level of abstraction for said present third level of abstraction as results.

19. An apparatus for automatically abstracting a meaning from a sequence of words, using a machine comprising:
means for receiving a sequence of words;
database means, including a prestored plurality of categories of meaning for each said word, for producing at least one category of meaning for each of said words of said sequence; and
processing means for automatically selecting certain ones of said plurality of categories of meanings by determining categories of meanings which are common for different ones of said respective words, said common categories of meanings being used as abstracted meanings for the sequence.

20. An apparatus as in claim 19, wherein said database means stores a plurality of pre-stored categories of meanings at different levels of abstraction for each said word, said levels of abstraction ranging progressively from a lowest level of abstraction which is a more specific category of meaning of the word to a last level of abstraction which is a more general category of meaning of the word, wherein said at least one category of meaning for each said word includes categories of meanings from each said level of abstraction for each said word, and wherein said processing means includes means for determining common elements within each said level of abstraction for each said word, and using said common elements for each said level of abstraction as said abstracted meanings within said each level of abstraction.

21. An apparatus as in claim 20, wherein said processing means includes:
means for storing a multiple-dimensional array of information from said database means, each said level of abstraction representing one dimension of the array, and each word of the sequence representing another dimension of the array, and
means for determining common categories of meanings among said words, within each said one dimension representing each said level of abstraction.

22. An apparatus as in claim 20, wherein said processing means processes said abstracted meanings by correlating categories of meaning within one of said levels of abstraction to categories of meaning within another level of abstraction.

23. An apparatus as in claim 20, wherein said sequence of words is in natural language, and said database means is a Roget-type database having multiple levels of abstraction.

24. An apparatus as in claim 23, wherein said database is Roget's thesaurus, and has four levels of abstraction.

25. An apparats as in claim 19, wherein said processing means includes means for:
storing an array of information from said database means, each element of the array including said at least one category of meaning for said each word, and
determining common ones of said categories of meaning.

26. An apparatus for automatically abstracting a meaning from a sequence of words using a machine, comprising:
means for receiving a sequence of words;
a database processor of the type that includes a plurality of categories of meanings at different levels of abstraction for each said word, each said level of abstraction ranging progressively from a lowest level which is a more specific category of meaning of the word to a last level which is a more general category of meaning of the word, for receiving said sequence of words and analyzing each said word to obtain a plurality of categories of meaning for each said word which includes category of meanings from each said level of abstraction for each said word of said sequence; and
processing means for automatically determining ones of said categories of meanings within each said level of abstraction which are common for different ones of said respective words and using said common categories of meanings as abstracted meanings for the sequence.

27. An apparatus as in claim 26, wherein said processing means comprises means for further processing said abstracted meanings to obtain a plurality of further categories of meaning into which said sequence belongs.

28. An apparatus as in claim 26, further comprising the step of processing said abstracted meanings by correlating categories of meanings within one of said levels of abstraction to categories of meanings within another level of abstraction.

29. An apparatus as in claim 26, wherein said sequence is in natural language, and said database is a Roget-type database.

30. An apparatus for automatically abstracting a category of meaning from a sequence of words using a machine, comprising:
means for obtaining, for each of a sequence of words, pointers to all categories of meanings which said each word can convey; and
means for automatically determining which are the most likely categories of meanings to be intended by the sequence, by determining ones of said categories of meanings which are common for different ones of said respective words.

31. An apparatus as in claim 30, wherein said obtaining means includes means for obtaining said categories of meanings at each of a plurality of different levels of abstraction for each said word, said levels of abstraction ranging progressively from a lowest level of abstraction which is a more specific category of meaning of the word to a highest level of abstraction which is a more general category of meaning of the word, wherein said at least one category of meaning for each said word includes categories of meanings from each said level of abstraction for each said word, and wherein said determining means includes means for determining common elements within each said level of abstraction for each said word.

32. An apparatus as in claim 31, wherein said determining means further comprises means for processing said abstracted category of meaning by correlating categories of meanings within one of said levels of abstraction to category of meanings within another level of abstraction.

33. An apparatus as in claim 32, wherein said processing means includes means for:

deriving and storing a plurality of pre-formed rules for correlating one of said levels of abstraction with another level of abstraction.

34. An apparatus as in claim 33, wherein said processing means includes means for deriving said rule by:

taking a first level of abstraction and processing each category of meaning in said first level of abstraction by correlating categories of meanings within each of a second level of abstraction within said first level of abstraction, and which second level of abstraction is one more specific than said first level of abstraction, to get a plurality of results in each said second level of abstraction for each said first level of abstraction, mapping each said result in said second level into a third level of abstraction more general than said first level; and determining if any of said mapped third level results are present and using said second level of abstraction for said present third level of abstraction as results.

* * * * *